(12) United States Patent
Fleizach

(10) Patent No.: US 10,650,499 B1
(45) Date of Patent: May 12, 2020

(54) FAST AND EFFECTIVE IMAGE INPAINTING FOR RETICLE REMOVAL

(71) Applicant: THE UNITED STATES OF AMERICA AS REPRESENTED BY THE SECRETARY OF THE NAVY, San Diego, CA (US)

(72) Inventor: Gregory K. Fleizach, San Diego, CA (US)

(73) Assignee: United States of America as represented by the Secretary of the Navy, Washington, DC (US)

( * ) Notice: Subject to any disclaimer, the term of this patent is extended or adjusted under 35 U.S.C. 154(b) by 119 days.

(21) Appl. No.: 16/046,705

(22) Filed: Jul. 26, 2018

(51) Int. Cl.
  *G06T 5/00* (2006.01)
  *G06T 5/20* (2006.01)

(52) U.S. Cl.
  CPC .............. *G06T 5/005* (2013.01); *G06T 5/20* (2013.01)

(58) Field of Classification Search
  CPC ............ G06T 5/005; G06T 11/60; G06T 5/20
  See application file for complete search history.

(56) References Cited

U.S. PATENT DOCUMENTS

| 6,987,520 B2 * | 1/2006 | Criminisi | G06T 11/001 345/582 |
|---|---|---|---|
| 7,755,645 B2 * | 7/2010 | Sun | G06T 5/005 345/582 |
| 7,840,086 B2 | 11/2010 | Bertozzi | |
| 8,605,992 B2 * | 12/2013 | Kohli | G06T 5/005 345/419 |
| 8,731,324 B1 | 5/2014 | Huang | |
| 8,938,119 B1 | 1/2015 | Han | |
| 9,641,794 B2 | 5/2017 | Wang | |
| 2011/0123113 A1 * | 5/2011 | Berretty | G06T 5/005 382/173 |
| 2011/0208716 A1 * | 8/2011 | Liu | G06F 21/36 707/710 |

OTHER PUBLICATIONS

Oliveira et al, "Fast Digital Image Inpainting." Proceedings of the International Conference on Visualization, Imaging and Image Processing. Sep. 2001.

* cited by examiner

*Primary Examiner* — John J Lee
(74) *Attorney, Agent, or Firm* — Naval Information Warfare Center, Pacific; Kyle Eppele

(57) ABSTRACT

A memory device receives an original input image having at least one horizontal reticle or at least one vertical reticle. The memory device also receives a horizontal reticle mask image for horizontal reticles and/or a vertical reticle mask image for vertical reticles. A processor inpaints three regions: (1) vertical reticles with a horizontal filter, (2) horizontal reticles with a vertical filter, and (3) an intersection of the horizontal and vertical reticles with a two dimensional filter. A single inpainted image is produced. The processor determines whether a maximum change in any one of the first inpainted region, the second inpainted region or the third inpainted region equals or exceeds a predetermined threshold, and if so, repeating the inpainting steps. Once the maximum change in pixel intensity is less than the predetermined threshold the processing stops.

20 Claims, 5 Drawing Sheets

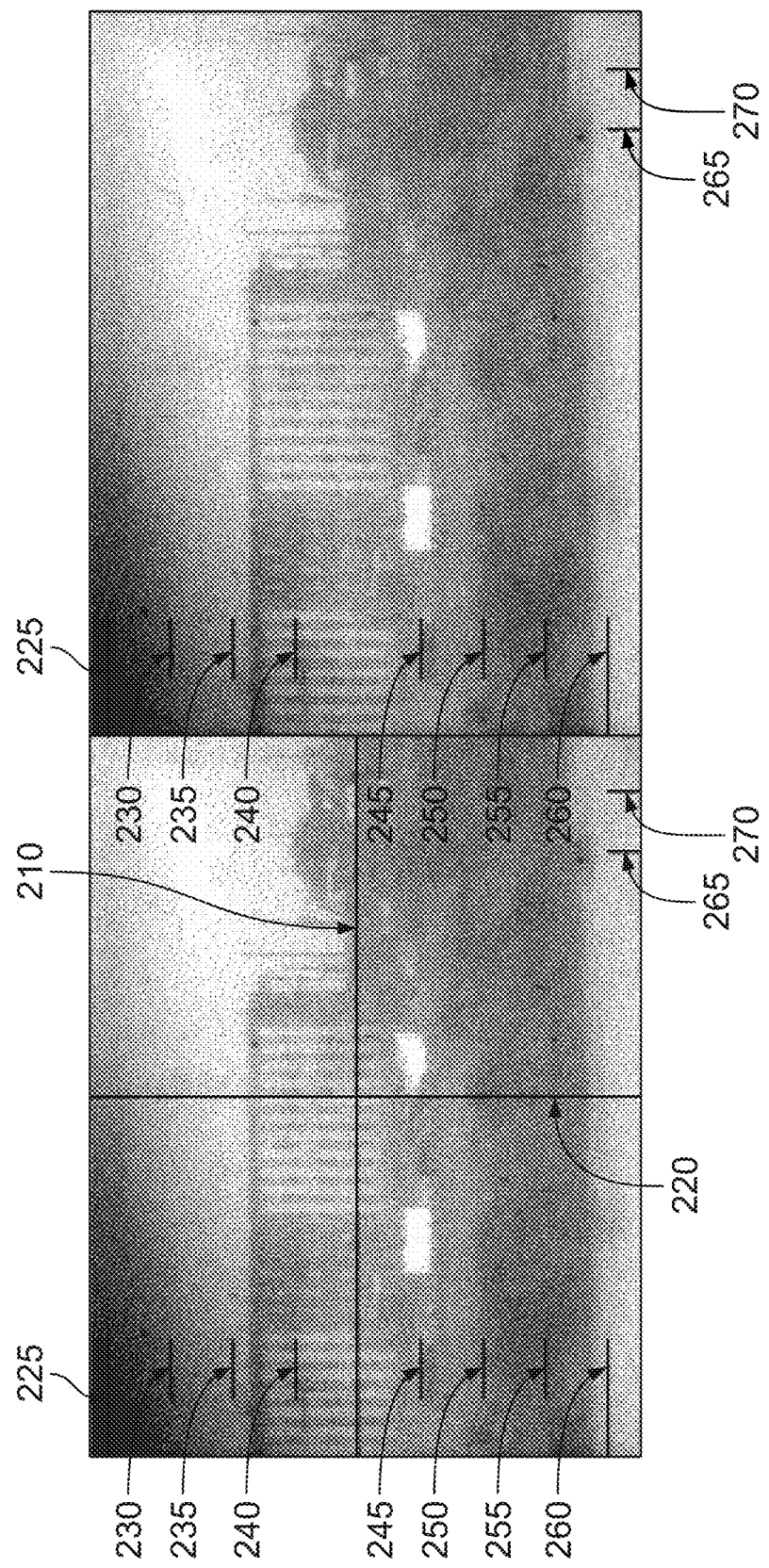

FAST AND EFFECTIVE IMAGE INPAINTING FOR RETICLE REMOVAL

FEDERALLY-SPONSORED RESEARCH AND DEVELOPMENT

The United States Government has ownership rights in this invention. Licensing inquiries may be directed to Office of Research and Technical Applications, Space and Naval Warfare Systems Center, Pacific, Code 72120, San Diego, Calif., 92152; telephone (619)553-5118; email: ssc_pac_t2@navy.mil. Reference Navy Case No. 103,659.

BACKGROUND

This disclosure relates to image processing, and more particularly, to reticle removal.

Reticles may be used to measure scale and/or location in microscope, telescope, and other imaging systems. For example, a reticle may be used to mark how tall an image object is. The reticles may be black or white for high contrast. However, reticles can interfere with digital image processing algorithms. Effects such as halos and ringing are not uncommon around the reticles and they can also skew the histogram, which is used in many contrast enhancement algorithms. Additionally, some imaging systems impose the reticles on the image or video before digitization, which means the reticles may not always reside in exactly the same pixel location in the resulting digital image.

Inpainting is a process that has been used to fill in missing or damaged portions of an image. Inpainting has also been used to restore and conserve art. The idea is to use undamaged portions of the image closest and/or most similar to the missing regions to "inpaint" the missing/damaged regions. For digital images, the inpainting process begins with identifying the areas to be inpainted with a "mask image." The mask image is a binary image with ones in the locations that the algorithm will consider to be missing and zeros elsewhere. The mask image is passed to the algorithm with the original image for inpainting.

Inpainting may be used for reticle removal since, as mentioned, the location of the reticles may vary from frame to frame, but within a certain number of pixels. As such, a mask image may be identified a priori that covers the range over which the reticles can vary. Then inpainting can fill in the image area under the reticles.

The simplest methods to perform inpainting include nearest neighbor approaches or two-dimensional (2D) filtering. These approaches have low complexity, but can cause excessive blurring or other objectionable artifacts. Other prior methods that are more complex achieve good results, but can take many minutes to process a single frame. Obviously, this is unacceptable for a real-time video system where, for a thirty frame per second (30 fps) video stream, each frame must be processed within tens of milliseconds. Such inpainting methods are typically exemplar-based, which sample and copy color values from undamaged regions of the image, or patch-based, which copy whole patches of pixels from other portions of the image.

Many prior methods, such as exemplar-based inpainting, perform "pixel priority" calculations to determine the optimal order of pixels to be inpainted. Inpainting pixels in a certain order can achieve visually impressive results, but this kind of logic makes a high-degree of parallelization difficult. Again, this makes real-time implementations difficult. Some other methods require a priori depth/disparity information to be provided about the image, which may be impractical for many real-world applications. Further, other inpainting methods depend on the solution of differential equations, which may be cumbersome and computationally expensive.

Last, many of these complex inpainting methods can produce unpredictable results. That is, inconsistent edges or physically impossible objects are not uncommon products of some of these algorithms. Unpredictable results are unacceptable for a real-time imaging system.

There is a need for reticle removal system and method that is fast and efficient. There is further a need for a reticle removal system and method that uses inpainting and that produces more predictable results.

BRIEF DESCRIPTION OF THE DRAWINGS

The accompanying drawings, which are incorporated in and form a part of the specification, illustrate example embodiments and, together with the description, serve to explain the principles of the method and system for reticle removal using image inpainting. In the drawings:

FIG. 2A is an original input image for which reticles may be removed with the present method and system. FIG. 2B is the image of 2A, but after reticles have been removed in accordance with one embodiment of the present disclosure.

DETAILED DESCRIPTION OF SOME EMBODIMENTS

Figure 1:
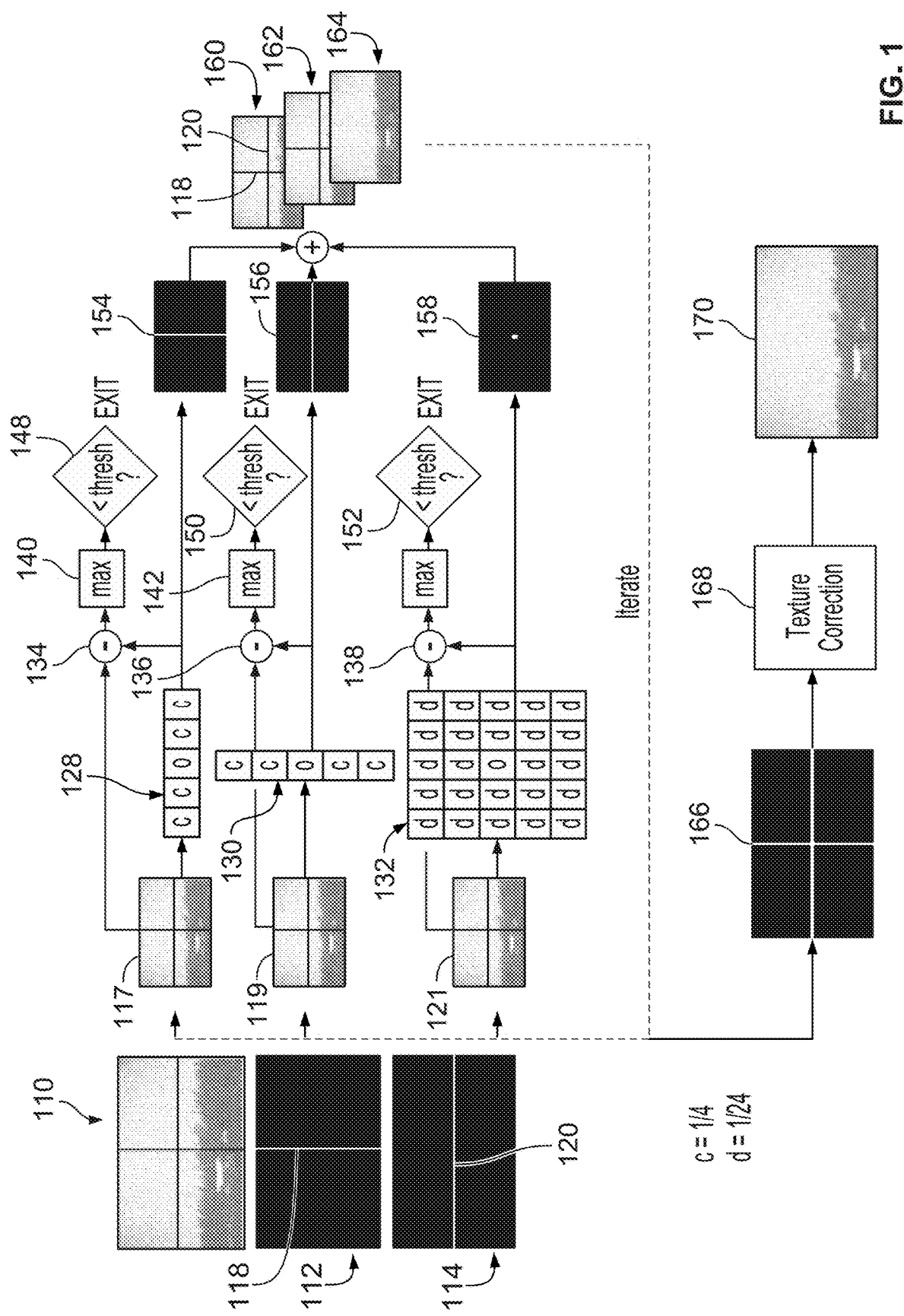
FIG. 1 is a block diagram of a method for reticle removal using image inpainting in accordance with one embodiment of the present disclosure.

The present system and method for reticle removal uses an inpainting technique with iterative filtering. A block diagram of the method is shown in FIG. 1. The method includes receiving into at least one memory an original input image 110 with horizontal and vertical reticles, a vertical reticle mask image 112 and a horizontal reticle mask image 114, as shown to the left of FIG. 1.

The vertical reticle mask image 112 and the horizontal reticle mask image 114 are used to identify where the reticles in the original input image 110 occur. In the swath of vertical pixels in the vertical reticle mask image 112 and in this swath of horizontal pixels in the horizontal reticle mask image 114, we know where the vertical and horizontal reticles will be. Each of the original input image 110, the vertical reticle mask image 112 and the horizontal reticle mask image 114 may be received into the same memory or different memories, as long as these memories are accessible by the system. It should be noted that the present system and method may be utilized with only horizontal reticles, or only vertical reticles, or both horizontal and vertical reticles.

Copies of the original input image 110 may be used to remove the horizontal and/or vertical reticles. The original input image copies 117, 119, 121 may be used instead of the original input image 110 where it is desired that the original input image 110 remain intact. For example, an original input image copy 117 may be used to process removal of the vertical reticle 118. An original input image copy 119 may be used to process removal of the horizontal reticle 120. An original input image copy 121 may be used to process removal of the intersection of the vertical reticle 118 and horizontal reticle 120.

The original input image 110 includes a vertical reticle 118 and a horizontal reticle 120. The system fills in, on the original input image copy 117, pixels behind the vertical reticle 118, thus creating a first inpainted region. This filling in behind the vertical reticle 118 is done by applying, via a processor, a horizontal filter 128. A vertical filter 130 is used to fill the image in behind the horizontal reticle 120 in original input image copy 119, thus creating a second inpainted region. Intersection filter 132 is used to fill in the original input image copy 121 at the center pixels of the vertical and horizontal reticles, thus creating a third inpainted region. These three regions are inpainted when pixels in said regions are filled in using the various filters.

The horizontal filter 128 may be a one-dimensional separable filter. In the present example of FIG. 1, a one by five (1×5) horizontal filter 128 is used to fill in the original input image copy 117 behind the vertical reticle 118. The vertical filter 130 may also be a one-dimensional separable filter. In the present example of FIG. 1, a vertical filter 130 is used to fill in the original input image copy 119 behind the horizontal reticle 120. The vertical filter 130 may be a five by one (5×1) one-dimensional filter. Intersection filter 132 is a five by five (5×5) two-dimensional vertical and horizontal filter used to fill in the original input image copy 121 at the intersection of the vertical reticle 118 and the horizontal reticle 120. Each of the filters 128, 130, 132 initially receives either the original input image 110 or respective original input image copies 117, 119, 121.

Each one-dimensional filter has a coefficient of $c=\frac{1}{4}$ except for a zero in the center position, i.e., when filling in a missing pixel it does not take that missing pixel into account. The intersection of the vertical reticle 118 and the horizontal reticle 120 is treated as a special case since both the horizontal filter 128 and the vertical filter 130 will not produce any nonzero values at the intersection. Instead a two-dimensional (2D) intersection filter 132 with coefficients $d=\frac{1}{24}$ (and zero at the center of the filter) is used. The two-dimensional filter 132 may be a five by five (5×5) filter with a coefficient of $d=\frac{1}{24}$ and the zero at the center of the filter. The filtering takes place on each of the red, green and blue (RGB) color channels. Therefore, in a single pass of filtering, the horizontal filter 128 is applied for each of the red, green and blue color channels. Then the vertical filter 130 is applied for each of the red, green and blue color channels. Then, an intersection filter 132 is applied for each of the red, green and blue color channels. Each of these steps is taken for each pixel.

The coefficients listed above for the filters are not the only possible values, but just examples of values.

The horizontal filter 128, vertical filter 130 and intersection filter 132 do not have to be 1×5, 5×1, and 5×5, respectively. The sizes of horizontal filter 128, vertical filter 130 and intersection filter 132 are dependent on the width of the reticles that are being removed: larger reticles need larger filters and smaller reticles can use smaller filters. Prior to removing the vertical reticle 118 and the horizontal reticle 120, the system may narrow the width of the vertical reticle 118 in the vertical reticle mask image 112 and the horizontal reticle 120 in the horizontal reticle mask image 114 so that fewer pixels need to be inpainted.

The inpainted regions produced by the horizontal filter 128, vertical filter 130, and two-dimensional filter 132 are then selected using the appropriate mask image. These inpainted regions were formerly vertical reticle 118, horizontal reticle 120 and the intersection thereof. These inpainted regions are then combined into a single inpainted image where the portions of the original input image that did not have reticles remain unchanged.

The inpainted regions may be selected manually by the user via an input device, e.g., via a computer mouse, joystick, keyboard, touch screen, or automatically by the reticle removal system and method. The vertical reticle mask image 112 and the horizontal reticle mask image 114 may be created manually or automatically. If the inpainted regions are selected manually, the user may select the inpainted regions with a mouse and/or other input device and input the coordinates of the inpainted regions. If the inpainted regions are selected automatically, this selection step may be performed by the system. The system could know generally that reticles are in center of the image, and the system could search the pixels near the center. The system could look at the minimum intensity of the image pixels if the reticle is black. The system could look at the maximum of the image pixels if the reticle is white. The appropriate mask image is one that has the values of zeros where the original input image 110 (or any of original input image copies 117, 119, 121 if a copy is used) does not need to be inpainted and the values of ones where the image does need to be inpainted.

Note that the inpainted region from the two-dimensional intersection filter 132 is just the intersection of the vertical reticle mask image 112 and the horizontal reticle mask image 114. Although the present example describes filtering only the pixels in the inpainted regions, it is possible to filter the entire image and only retain the masked regions at the output.

Each iteration diffuses the image data on the edges of the reticles further into the masked regions. It may take about thirty (30) to forty (40) iterations to completely inpaint the first, second and third inpainted regions. In practice, fifty (50) iterations may be sufficient to generate excellent results. More than fifty (50) maximum iterations can be used, but this will take more time to process and the results may not tend to improve very much.

There is check on changes 134, 136, 138 in pixel intensity in each of the first, second and third inpainted or masked regions. More particularly, there is a check on the first inpainted region change 134, a check on the second inpainted region change 136 and a check on the third inpainted region change 138. When any of the first inpainted region maximum change 140, the second inpainted region maximum change 142 and the third inpainted region maximum change 144 have a maximum change less than the first inpainted region threshold 148, second inpainted region threshold 150 and the third inpainted region threshold 152, then the iterations will end at vertical reticle end 154, horizontal reticle end 156 and intersection reticle end 158.

If the changes at first inpainted region change 134, second inpainted region change 136, or third inpainted region change 138 caused by an iteration of the filtering is less than a specified threshold for first inpainted region threshold 148, second inpainted region threshold 150 and the third inpainted region threshold 152, then the iterations stop. This identifies the condition of diminishing returns where further iterations may refine the inpainting results numerically, but result in no discernible change in the image. Otherwise, the iterations continue with the image synthesized from the original and the inpainted regions as the input to the next iteration. The iterations can also stop when they reach the maximum number of iterations (possibly 50).

The filtering is only necessary in the masked regions. Any additional filtering outside of these regions will be overwritten in the last step of each iteration where only the filtering from the masked regions is retained. This is important because it drastically reduces the number of computations required for reticle removal.

The images on the right of FIG. 1 at first iterative image 160, second iterative image 162, and third iterative image 164 show how the vertical reticles 118, and horizontal reticle 120 fade on successive iterations until they substantially disappear completely from the image. In each of these first, second and third iterative images 160, 162, 164, the first inpainted region, the second inpainted region and the third inpainted region are combined into a single inpainted image. The threshold against which the maximum intensity is compared is fixed. The threshold may be a predetermined threshold. In some embodiments, the predetermined threshold is a small number determined heuristically that is used to decide when the image is no longer changing significantly, which indicates that the processing has completed. A first output image 166 is generated based at the end of the iterative process. In this final output image of the iterative process, the reticles will be considered removed once the iterative process completes or ends.

When the iterations complete, the last step is to correct the texture in the inpainted regions as shown at step 168. This helps to make the inpainted regions look more natural. Without such a correction, inpainting generates unnaturally homogenous results. To maintain a natural-looking image, texture can be synthetically added to the inpainted regions using additive Gaussian noise. This makes the image look more realistic.

First, the image must be converted from the RGB color space to YCbCr color space. The color space denoted as YCbCr represents color as brightness and two color difference signals, while RGB represents color as red, green and blue. In YCbCr, the Y is the brightness (luma), Cb is blue minus luma (B-Y) and Cr is red minus luma (R-Y). This transformation separates the RGB color channels into an intensity channel and two color channels. Only the intensity channel will be texture-corrected as shown at step 168. The texture does not have to be corrected as the last step, but it does improve the result and at a low computational cost. A second output image 170 is generated after texture correction.

Another alternative for the texture correction would be to measure the noise in a small region close to the reticles and use this estimate as the variance for the synthetically-generated texture.

Instead of synthetically generating the texture, another possibility is to retrieve texture from the image itself. This involves finding an adjacent horizontal or vertical stripe in the image, taking the mean of the stripe in the shorter dimension, and subtracting the mean from the original stripe. This gives an excellent estimate of the texture in the inpainted region. However, excessively bright or dark objects in the stripe can skew the results.

In connection with adding texture back into the image, noise may be used to make the texture look more natural, so that the texture is not too smooth and unnatural. A suitable variance for the Gaussian noise in units of intensity squared is chosen (0.003 seems to work well for an image in the range [0,1]) and the noise is added to the Y-channel of the YCbCr image. Error-checking must be performed to make sure and confirm that the pixels stay within a valid pixel coordinate range. For example, a pixel may need to be within a range of a standard display screen, which has pixel values between the range of 0 and 255. Additionally, if the noise is added to the vertical and horizontal mask regions separately, care must be taken that twice the noise is not added to the intersection of the masked regions. After the noise is added, the image is transformed from YCbCr color space back to RGB color space for display.

FIG. 2A is an original input image that is used with the present method and system. Full horizontal reticle 210 substantially traverses the width of the original input image. Full vertical reticle 220 substantially traverses the height of the original input image. Horizontal reticles 225, 230, 235, 240, 245, 250, 255, 260 are also shown. Similarly, vertical reticles 265, 270 are shown.

FIG. 2B is the image of 2A, but with reticle removal in accordance with one embodiment of the present disclosure. Note that in this example the full horizontal reticle 210 and full vertical reticle 220 have been removed, but the shorter horizontal reticles 225, 230, 235, 240, 245, 250, 255, 260 have been retained for comparison. Similarly, vertical reticles 265, 270 have been retained for comparison.

Figures 3A, 3B:
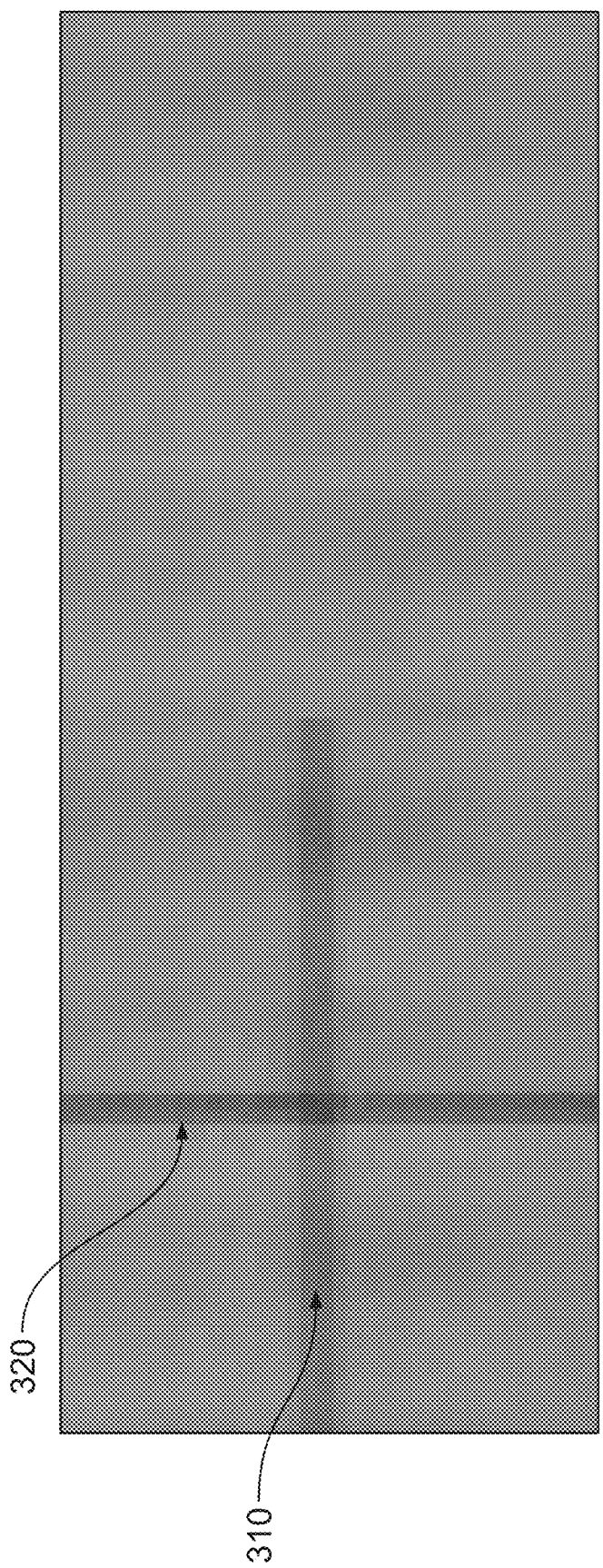
FIG. 3A is an enlarged version of the original input image of FIG. 2A with reticles.
FIG. 3B is the same image with reticles removed.

FIG. 3A is an enlarged version of the original input image of FIG. 2A with a full horizontal reticle 210 and a full vertical reticle 220. FIG. 3B is the same image with reticles removed. A zoomed-in portion of FIG. 2A is shown in FIG. 3A, where the vertical and horizontal reticles intersect. Not only have both the full horizontal reticle 210 and the full vertical reticle 220 been completely removed, but the removal has left no unnatural edges or overly smooth textures. The texture correction has blended the inpainted area with the rest of the image.

Advantages of the proposed inpainting system and method over previous systems are its simplicity both in concept and implementation. For example, searching for similar pixel patches or differential equations are not necessary for this invention. Further, the proposed system and method achieve nearly imperceptible reticle removal very quickly (~30 to 50 iterations of primarily separable 1D filtering).

The synthetic texture correction is a new feature not typically seen, but is very effective at generating a natural-looking result.

An important advantage of this invention over previous, more complex methods are that this method generates predictable results whereas exemplar- and patch-based algorithms can generate jarring inpainting results in certain scenarios.

Figures 4A, 4B:
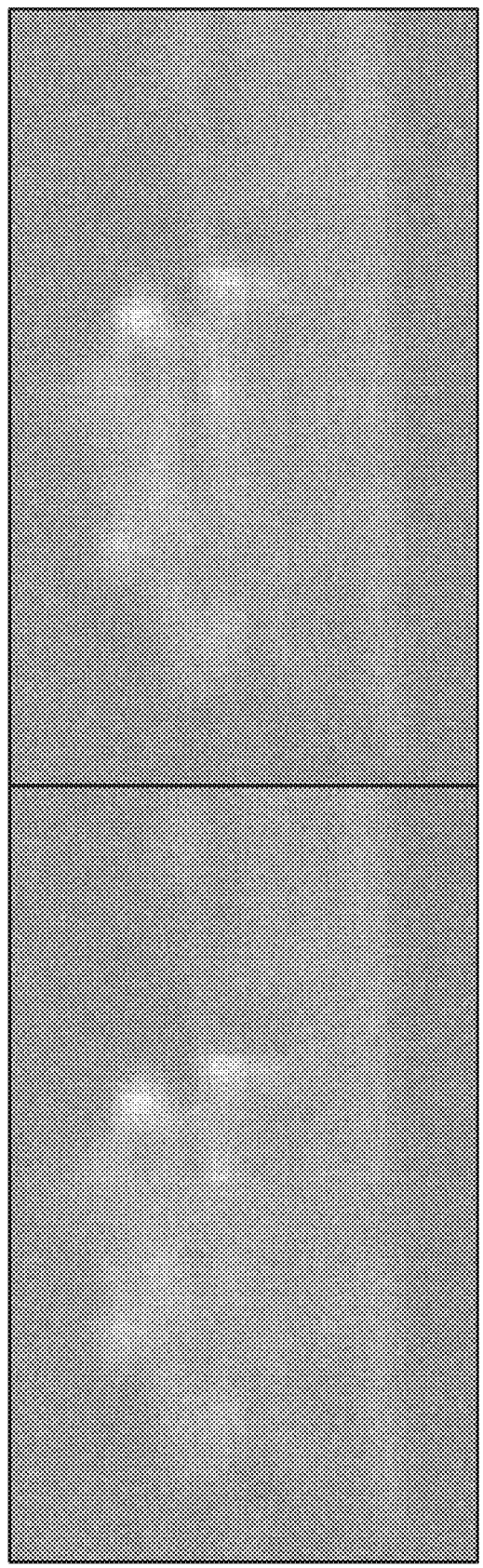
FIG. 4A is a standard two-dimensional (2D) filtered result used with the present reticle removal system and method.
FIG. 4B is a separable one dimensional (1D) filtered result used with the present reticle removal system and method.

FIG. 4A illustrates results of prior art reticle removal as used with a standard two-dimensional (2D) filter. FIG. 4B is a separable one dimensional (1D) filter used with the present reticle removal system and method. As shown, the use of separable one-dimensional filters (except for the intersection of the two reticles) for the horizontal and vertical reticle may minimize blurring, improve speed, and still provide excellent results.

An example of the improvement in blurring in shown in FIG. 4B. The left image shows the result from using the standard 2D filters where all the detail is lost in the inpainted region. On the right, however, the object has been preserved much more cleanly and clearly.

Another advantage is that the order in which pixels are inpainted is not important, which lends this invention to parallelization so that it may be used in real-time imaging systems.

Figure 5:
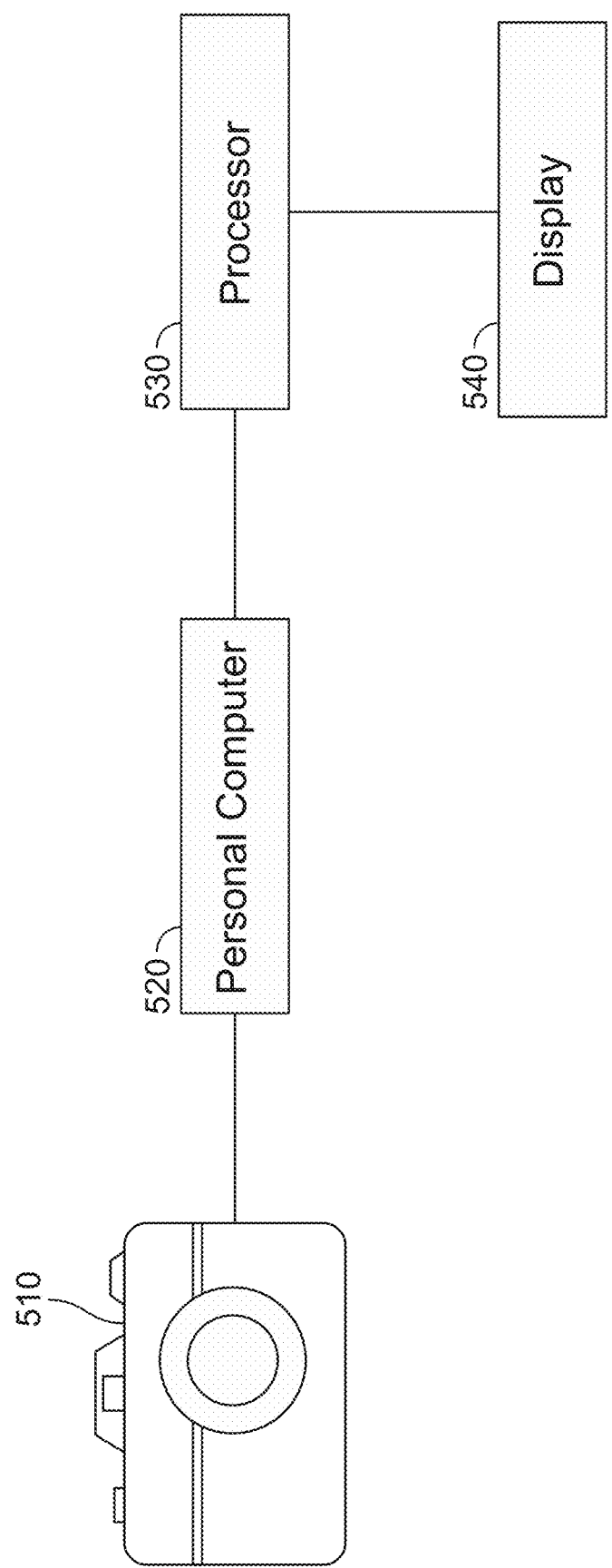
FIG. 5 is a system for reticle removal using image inpainting in accordance with one embodiment of the present disclosure.

FIG. 5 is a system for reticle removal in accordance with one embodiment of the present disclosure. The system 500 may include an imaging system 510, a personal computer 520 that is operably coupled to the imaging system 510, a processor 530 that is operably coupled to the imaging system 510 and a display 540 that is operably coupled to the imaging system 510.

The imaging system 510 could be any digital imaging system. Digital imaging system 510 can connect to personal computer 520. The original input image may be fed from the imaging system 510 to the personal computer 520. The personal computer 520, which may include its own memory and processor, may feed the image to another processor 530 such as a graphics processing unit.

As an alternative to the system illustrated in FIG. 5, the personal computer 520 may be removed and the imaging system 510 and processor 530 can be connected immediately adjacent to each other. Some processing that was done by the personal computer 520 may be off-loaded to the imaging system 510 (which may include a processor) and/or the processor 530 shown in FIG. 5.

Software (not shown in FIG. 5) may be resident in the memory of personal computer 520, which may cause the processor 530 to perform one or more steps of the method for reticle removal using image inpainting as set forth herein. If mechanical/electrical devices (whether existing as part of the imaging system or added thereafter) are used to further aid in this process, such devices may be located within the body of imaging system 510 or elsewhere as can be appreciated by one of ordinary skill in the art.

A memory resident on imaging system 510 and/or personal computer 520, as noted hereinabove, is sufficient to hold at least the original input image, the mask image for the horizontal reticle, the mask image for the vertical reticle, and output images of imaging system 510 that result from the iterative process. A memory resident on imaging system 510 and/or personal computer 520, may also include other elements such as copies of the original input image, as well as processing steps or instructions related to reticle removal using image inpainting. Examples of such processing steps are described in the flow chart of FIG. 1.

The speed of the processor 530 needed may depend on the application in which the processor 530 is used, as can be appreciated by one of ordinary skill in the art.

The foregoing description of various embodiments has been presented for purposes of illustration and description. It is not intended to be exhaustive or to limit the invention to the precise forms disclosed, and obviously many modifications and variations are possible in light of the above teaching. The example embodiments, as described above, were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

I claim:

1. A method for removing reticles using image inpainting, the method comprising:
   first, receiving, at a memory device, an original input image having at least one horizontal reticle or at least one vertical reticle;
   second, receiving, at the memory device, a horizontal reticle mask image for said at least one horizontal reticle or a vertical reticle mask image for said at least one vertical reticle;
   third, in a first inpainting step, inpainting, via a processor, on the original input image, vertical pixels for the at least one vertical reticle with a horizontal filter, thus creating a first inpainted region;
   fourth, in a second inpainting step, inpainting, via the processor, on the original input image, horizontal pixels for the at least one horizontal reticle with a vertical filter, thus creating a second inpainted region;
   fifth, in a third inpainting step, inpainting, via the processor, an intersection of the at least one horizontal reticle and the at least one vertical reticle with a two-dimensional filter, thus creating a third inpainted region;
   sixth, selecting, via an input device, the first inpainted region, the second inpainted region and the third inpainted region;
   seventh, outputting, via the processor, an output image that combines the first inpainted region, the second inpainted region and the third inpainted region into a single inpainted image; and
   eighth, determining, via the processor, whether a maximum change in pixel intensity in any one of the first inpainted region, the second inpainted region or the third inpainted region equals or exceeds a predetermined threshold, and if so, repeating the first step to the eighth step, wherein the output image is the original input image;
   ninth, otherwise, ending the method steps.

2. The method of claim 1, further comprising:
   correcting, via the processor, texture in the first, second and third inpainted regions.

3. The method of claim 2, wherein the correcting step is performed using Gaussian noise.

4. The method of claim 2, wherein the correcting step includes:
   converting the output image from an RGB color space to a YCbCr color space, thus creating an intensity channel and two color channels;
   selecting a suitable variance; and
   texture-correcting only the intensity channel.

5. The method of claim 2, further comprising:
   after the correcting step, error-checking to confirm that a pixel coordinate value is within a valid pixel coordinate range for a display.

6. The method of claim 1, further comprising:
   prior to any of said first inpainting step, said second inpainting step, or said third inpainting step, narrowing the width of the at least one horizontal reticle in the horizontal reticle mask image and/or the at least one vertical reticle in the vertical reticle mask image.

7. The method of claim 1, wherein a maximum number of iterations for the first step through the eighth step is fifty (50).

8. The method of claim 1, wherein the horizontal filter is a one dimensional filter.

9. The method of claim 1, wherein the vertical filter is a one dimensional filter.

10. A system for removing reticles using image inpainting, the system comprising:
    a memory device configured to receive an original input image having at least one horizontal reticle or at least one vertical reticle;
    a horizontal reticle mask image for said at least one horizontal reticle;
    a vertical reticle mask image for said at least one vertical reticle;
    a processor configured to:
       remove reticles including:
          inpaint, on the original input image, vertical pixels for the at least one vertical reticle with a horizontal filter, thus creating a first inpainted region;

inpaint, on the original input image, horizontal pixels for the at least one horizontal reticle with a vertical filter, thus creating a second inpainted region;

inpaint, on the original input image, an intersection of the at least one horizontal reticle and the at least one vertical reticle with a two-dimensional filter, thus creating a third inpainted region;

output an output image that combines the first inpainted region, the second inpainted region, and the third inpainted region into a single inpainted image;

determine whether a maximum change in pixel intensity in any one of the first inpainted region, the second inpainted region or the third inpainted region exceeds a predetermined threshold, and if so, the output image is the original input image;

determine whether a maximum change in the pixel intensity in any one of the first inpainted region, the second inpainted region or the third inpainted region is less than the predetermined threshold, and if so, outputting a final output image with the reticles removed; and an input device configured to select the first inpainted region, the second inpainted region and the third inpainted region.

11. The system of claim 10, wherein the processor is further configured to correct texture in the first, second and third inpainted regions.

12. The system of claim 11, wherein the processor is configured to correct texture using Gaussian noise.

13. The system of claim 11, wherein the processor is further configured to:
convert the output image from an RGB color space to a YCbCr color space, thus creating an intensity channel and two color channels,
select a suitable variance; and
texture-correct only the intensity channel.

14. The system of claim 11, wherein the processor is further configure to error-check to confirm that a pixel coordinate value is within a valid pixel coordinate range for a display.

15. The system of claim 11, wherein the processor is further configured to:
prior to removing reticles, narrowing a width of the at least one horizontal reticle in the horizontal reticle mask image and/or the at least one vertical reticle in the vertical reticle mask image.

16. The system of claim 11, wherein the horizontal filter is a one dimensional filter.

17. The system of claim 11, wherein the vertical filter is a one dimensional filter.

18. A method for removing reticles using image inpainting, the method comprising:
first, receiving, at a memory device, an original input image having at least one horizontal reticle or at least one vertical reticle;
second, receiving, at the memory device, a horizontal reticle mask image for said at least one horizontal reticle or a vertical reticle mask image for said at least one vertical reticle;
third, in a first inpainting step, inpainting, via a processor, on the original input image, vertical pixels for the at least one vertical reticle with a horizontal one dimensional filter, thus creating a first inpainted region;
fourth, in a second inpainting step, inpainting, via the processor, on the original input image, horizontal pixels for the at least one horizontal reticle with a vertical one dimensional filter, thus creating a second inpainted region;
fifth, in a third inpainting step, inpainting, via the processor, an intersection of the horizontal and vertical reticles with a two-dimensional filter, thus creating a third inpainted region;
sixth, selecting, via an input device, the first inpainted region, the second inpainted region and the third inpainted region;
seventh, outputting, via the processor, an output image that combines the first inpainted region, the second inpainted region and the third inpainted region into a single inpainted image;
eighth, determining, via the processor, whether a maximum change in pixel intensity in any one of the first inpainted region, the second inpainted region or the third inpainted region equals or exceeds a predetermined threshold, and if so, repeating the first step through the eighth step, wherein the output image is the original input image;
ninth, otherwise, correcting, via the processor, texture in the first, second and third inpainted regions.

19. The method of claim 18, wherein the correcting step is performed using Gaussian noise.

20. The method of claim 18, further comprising:
after the correcting step, error-checking to confirm that a pixel coordinate value is within a valid pixel coordinate range for a display.

* * * * *